United States Patent Office 2,994,718
Patented Aug. 1, 1961

2,994,718
METHOD FOR PREPARATION OF ALKYLDIBORANES
Richard K. Pearson, Zelienople, and James D. Klicker, Mars, Pa., assignors to Callery Chemical Company, Pittsburgh, Pa., a corporation of Pennsylvania
No Drawing. Filed Feb. 28, 1955, Ser. No. 491,197
7 Claims. (Cl. 260—606.5)

This invention relates to the preparation of alkyldiboranes and more particularly it relates to a new and improved method for their preparation by the reaction of an alkali metal borohydride with a halogenated unsaturated aliphatic hydrocarbon in solution in a polyethyleneglycoldialkylether, $R(OC_2H_4)_nOR$, where R is a lower alkyl radical and $n$ is a number from 1 to 4.

Alkyldiboranes are generally prepared by the reaction of an olefin or trialkylborane with diborane. For example, monoethyldiborane, $B_2H_5C_2H_5$, is prepared by the reaction of ethylene with diborane or by the reaction of triethylborane $(C_2H_5)_3B$, with diborane. The di-, tri- and tetraethyl diboranes are prepared by varying the ratios of the two starting materials. Other alkyldiboranes can be prepared in a similar manner. Since alkali metal borohydrides such as sodium borohydride can be made more economically than diborane, it would be very desirable if alkyldiboranes could be made by using sodium borohydride as a starting material.

It is an object of this invention to provide a new and improved method for preparing alkyldiboranes by the reaction of an alkali metal borohydride with a halogenated unsaturated aliphatic hydrocarbon using a polyethyleneglycoldialkylether as the reaction medium.

Another object is to provide a new and useful method for preparing alkyldiboranes by reacting sodium borohydride with a halogenated unsaturated aliphatic hydrocarbon using a polyethyleneglycoldialkylether as the solvent.

Other objects of this invention will manifest themselves throughout the specification and claims which follow.

This new and improved method for preparing alkyldiboranes will be described more fully in the specification and the novelty thereof will be particularly pointed out and distinctly claimed.

This invention is based upon the discovery that an alkali metal borohydride such as sodium borohydride will react with a halogenated unsaturated aliphatic hydrocarbon such as vinyl bromide in a polyethyleneglycoldialkylether to yield an alkyldiborane. Thus, for the first time, it has become possible to prepare alkyldiboranes without the use of diborane as a starting material.

In one experiment, diethyldiborane, $B_2H_4(C_2H_5)_2$ was prepared as follows: 38.2 millimoles of sodium borohydride dissolved in 15 ml. of tetraethyleneglycoldimethylether $CH_3O(C_2H_4O)_4CH_3$ was allowed to stand for 12 hours in contact with 35.4 millimoles of vinyl bromide $(CH_2=CHBr)$ in the absence of air and at room temperature. At the end of this time a white precipitate formed which was sodium bromide. The volatile products of the reaction consisted of a mixture of triethylborane, $B(C_2H_5)_3$ and various alkyldiboranes represented by the formula $B_2H_{6-n}(C_2H_5)_n$ where $n$ is a number from 1 to 4. Hydrolysis of this mixture produced an amount of hydrogen which represented a yield of mixed ethyl substituted diboranes of 72% based on the vinyl bromide used according to the equation:

When this mixture was fractionally condensed through cold traps held at −63° C. and −78° C., the diethyldiborane contained therein passed through the −63° C. trap and was collected in the −78° C. trap. Further purification was obtained by repeating the fractionation process several times. In this manner a total of 2.56 millimoles of diethyldiborane was isolated which represented a yield of 14.5% based on the vinyl bromide used.

Analysis of the product isolated in the manner described above was carried out by ordinary hydrolysis for active hydrogen and by oxidation with fuming nitric acid to determine the boron and carbon content. The results of the analyses along with other physical data were as follows:

|  | Diethyldiborane | |
| --- | --- | --- |
|  | Observed | Calculated |
| H (mmoles/g.) | 46.9 | 47.8 |
| B (mmoles/g.) | 23.3 | 23.9 |
| C (mmoles/g.) | 49.2 | 47.8 |
| Mol. Wt. (by vapor density) | 90.0 | 83.6 |
| Vapor pressure (mm.) at −23.2° C | 10.4 | 10.0 |

The product of this reaction freezes to a glassy solid on cooling which is also in accord with the reported behavior of diethyldiborane.

In another experiment, di-n-propyldiborane,

was prepared as follows: 28.0 millimoles of sodium borohydride were dissolved in 10 ml. of tetraethyleneglycoldimethylether and to this solution was added 23.4 millimoles of allyl bromide $(CH_2=CH—CH_2Br)$. A rapid reaction took place even at temperatures below room temperature and a white precipitate identified as sodium bromide was formed. The volatile products of the reaction consisted of a mixture of tripropylborane, $B(C_3H_7)_3$ and various alkyldiboranes represented by the formula $B_2H_{6-n}(C_3H_7)_n$ where $n$ is a number from 1 to 4. Hydrolysis of this mixture produced an amount of hydrogen which represented a yield of mixed propyl substituted diboranes of 80% based on the allyl bromide used according to the equation:

When this mixture was fractionally condensed through cold traps held at −30° C. and −63° C., the di-n-propyldiborane contained therein passed through the −30° C. trap and was collected in the −63° C. trap. A total of 3.6 millimoles of di-n-propyldiborane was thus obtained which represented a yield of 30.8% based on the allyl bromide used. The observed vapor pressure of the product at 0° C. was 3.7 mm. compared to the literature value of 2.8 mm. for di-n-propyldiborane.

Disproportionation seemed to be more rapid than in the case of diethyldiborane as evidenced by the increase of vapor pressure at 0° C. during successive measurements. The purified di-n-propyldiborane yielded 33.1 millimoles of hydrogen per gram on hydrolysis compared to the calculated value of 32.9 millimoles per gram. Since the possibility of forming either n-propyl- or isopropyldiboranes existed in this reaction, the position of the boron linkage on the carbon chain was determined. Hydrolysis of the product obtained yielded a boronic acid with a M.P. of 105°–107° C. compared to the reported value for n-propylboronic acid of 107° C. Oxidation of the boronic acid with hydrogen peroxide followed by treatment with $MnO_2$ to destroy the excess $H_2O_2$ yielded a solution which gave a negative iodoform test indicating the absence of isopropyl alcohol. Thus, the product was identified as di-n-propyldiborane.

Other experimental data indicate that the reaction as described is a general method for the preparation of alkyldiboranes. Any halogenated unsaturated aliphatic hydrocarbon is suitable and any polyethyleneglycoldialkylether can be used as well as other alkali metal borohydrides. Thus, it should be understood that within the scope of the appended claims this invention may be practiced otherwise than as specifically described.

Having thus described this invention and the best mode contemplated for carrying it out as required by the patent statutes, what is desired to be claimed and secured by Letters Patent of the United States is:

1. A method for preparing an alkyldiborane which comprises reacting a solution of an alkali metal borohydride in a liquid polyethyleneglycoldialkylether with a lower alkenyl halide and recovering the alkyldiborane formed.

2. A method according to claim 1 in which the alkali metal borohydride is sodium borohydride.

3. A method according to claim 2 in which the polyethyleneglycoldialkylether used has the general formula $R(OC_2H_4)_nOR$ where R is a lower alkyl group and $n$ is an integer from 1 to 4.

4. A method according to claim 2 in which said halide is vinyl bromide.

5. A method according to claim 2 in which said halide is allyl bromide.

6. A method of preparing diethyldiborane which comprises reacting a solution of sodium borohydride in tetraethyleneglycoldimethylether with vinyl bromide at room temperature, separating the volatile products thus formed and isolating the diethyldiborane therefrom by fractional condensation.

7. A method of preparing di-n-propyldiborane which comprises reacting a solution of sodium borohydride in tetraethyleneglycoldimethylether with allyl bromide at a temperature below room temperature, separating the volatile products thus formed and isolating the di-n-propyldiborane therefrom by fractional condensation.

No references cited.